US006796206B2

(12) United States Patent
Li

(10) Patent No.: US 6,796,206 B2
(45) Date of Patent: Sep. 28, 2004

(54) WORKING MACHINE HAVING A SAFETY DOOR

(76) Inventor: Kuo-Hao Li, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/811,246

(22) Filed: Mar. 15, 2001

(65) Prior Publication Data

US 2002/0129686 A1 Sep. 19, 2002

(51) Int. Cl.[7] .............................. B23B 3/00; B23B 7/00
(52) U.S. Cl. ........................................... 82/117; 82/152
(58) Field of Search ................... 82/117, 152; 409/134; 408/241 G; 29/DIG. 56; 74/612; 192/133, 134, 135; 451/451, 452, 454, 455; 83/520; D15/126, 130

(56) References Cited

U.S. PATENT DOCUMENTS

| 2,201,244 | A | * | 5/1940 | Root |
| 2,400,639 | A | * | 5/1946 | Gayring |
| 2,655,067 | A | * | 10/1953 | Bechler |
| 2,802,235 | A | * | 8/1957 | Brown |
| 2,867,064 | A | * | 1/1959 | Hermansson |
| 3,175,298 | A | * | 3/1965 | Dengle |
| 3,204,499 | A | * | 9/1965 | Schoenrock |
| 4,108,517 | A | * | 8/1978 | Tomalinas et al. |
| 4,141,278 | A | * | 2/1979 | Lieser |
| D301,585 | S | * | 6/1989 | Linn .......................... D15/138 |
| D320,607 | S | * | 10/1991 | Smith et al. ............... D15/126 |
| D344,963 | S | * | 3/1994 | Lawhorn .................... D15/130 |
| 5,871,312 | A | * | 2/1999 | Haninger et al. ........... 409/134 |
| 6,263,947 | B1 | * | 7/2001 | Mullet ........................ 160/191 |

FOREIGN PATENT DOCUMENTS

WO           9852715    * 11/1998

* cited by examiner

Primary Examiner—Derris H. Banks
Assistant Examiner—Jamila Williams
(74) Attorney, Agent, or Firm—Alan D. Kamrath; Rider, Bennett, Egan & Arundel, LLP

(57) ABSTRACT

A working machine has a platform, a hood disposed on the platform, two lateral plates disposed on the platform and connected to the hood, a hollow interior confined by the hood and the lateral plates, and a safety door connected to the lateral plates. Each lateral plate has a semicircular frame. The hood has two arc plates, and two arc frames each communicating with the corresponding semicircular frame. The safety door has two oblong windows, two handles, a plurality of rollers disposed on two sides of the safety door, and a plurality of rolling bearings disposed on two sides of the safety door. The rollers and the rolling bearings move along the corresponding arc plate and the corresponding semicircular frame.

1 Claim, 6 Drawing Sheets

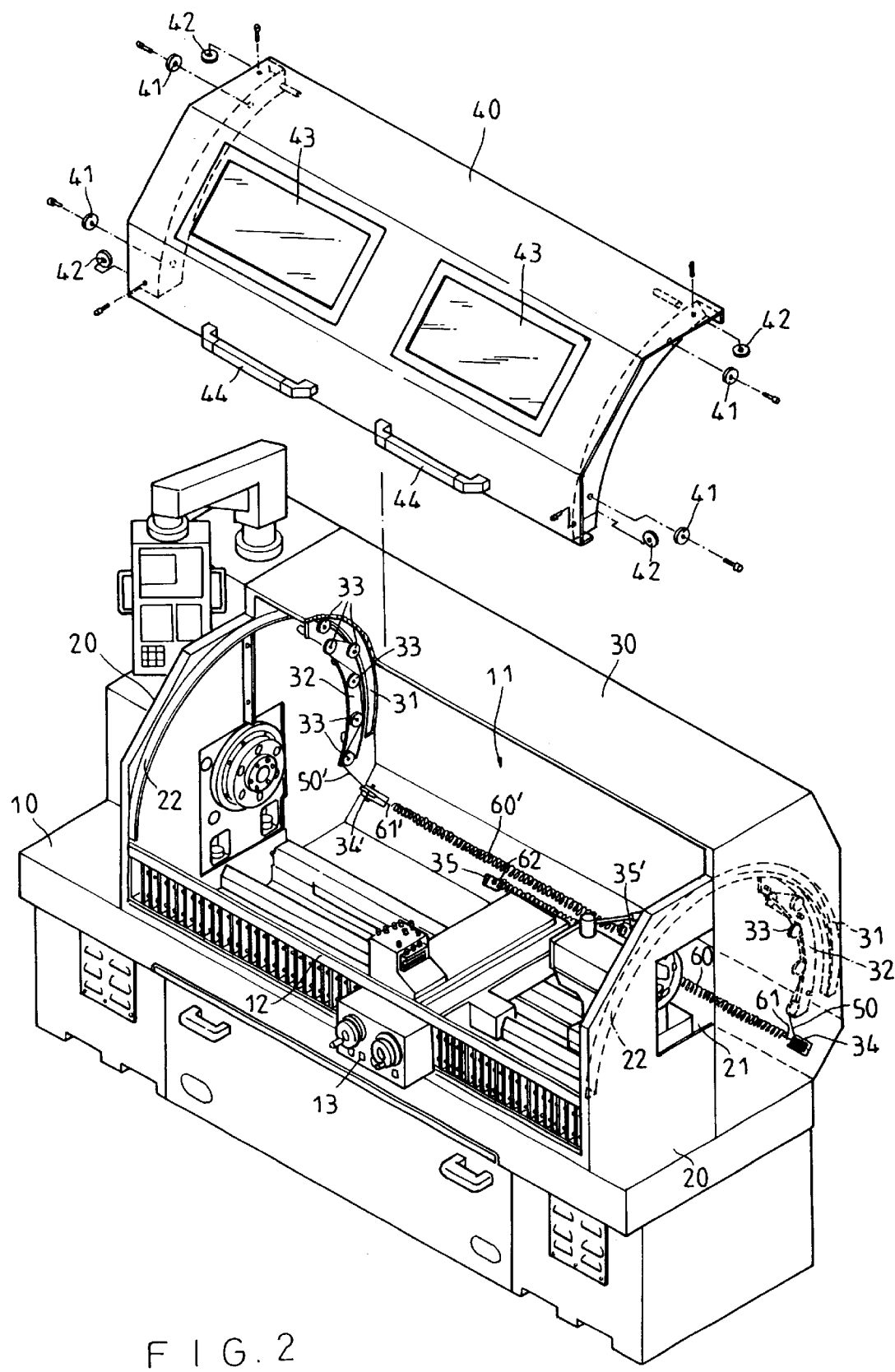
F I G. 2

WORKING MACHINE HAVING A SAFETY DOOR

BACKGROUND OF THE INVENTION

The present invention relates to a working machine. More particularly, the present invention relates to a working machine which has a safety door.

Referring to FIG. 1, a working machine comprises a main frame 1, a first safety door 5 disposed on the main frame 1, and a second safety door 6 connected to the first safety door 5. The main frame 1 has a safety button 9 and two side slots 2. Two first lugs 3 are disposed in the main frame 1. Two second lugs 3' are disposed on the first safety door 5. A pair of pulleys 7, a pair of handles 8, and a pair of third lugs 3" are disposed on the second safety door 6. Two cylinder shafts 4 are connected to the first lugs 3 and the second lugs 3'. The pulleys 7 are inserted in the side slots 2 of the main frame 1. The cylinder shafts 4 drive the first safety door 5 to move. Since liquid will enter the cylinder shafts 4 easily, the cylinder shafts 4 are easily broken. It is cumbersome to open the first safety door 5 and the second safety door 6. When the first safety door 5 and the second safety door 6 are opened, the first safety door 5 and the second safety door 6 occupy a large room.

SUMMARY OF THE INVENTION

An object of the present invention is to provide a working machine which has a safety door to be opened easily.

Another object of the present invention is to provide a working machine which has a safety door to be hidden in a hood while the safety door is opened so that the safety door will not occupy a large room.

Another object of the present invention is to provide a working machine which has a safety door to cover the working machine and the safety door will not be broken even if liquid enters the working machine.

Accordingly, a working machine comprises a platform, a hood disposed on the platform, two lateral plates disposed on the platform and connected to the hood, a hollow interior confined by the hood and the lateral plates, and a safety door connected to the lateral plates. Each of the lateral plates has a semicircular frame. The hood has two arc plates, and two arc frames each communicating with the corresponding semicircular frame. Each of the arc plates has a plurality of guide wheels. A first pulley and a first positioning seat are disposed in the hood. A second pulley and a second positioning seat are disposed in the hood. A first spring has a first end connected to the first positioning seat. A second spring has a second end connected to the second positioning seat. A first rope is connected to a second end of the first spring. A second rope is connected to a second end of the second spring. The first rope passes through the first pulley and the corresponding guide wheels and connects to the safety door. The second rope passes through the second pulley and the corresponding guide wheels and connects to the safety door. The safety door has two oblong windows, two handles, a plurality of rollers disposed on two sides of the safety door, and a plurality of rolling bearings disposed on two sides of the safety door. The rollers and the rolling bearings move along the corresponding arc plate and the corresponding semicircular frame.

BRIEF DESCRIPTION OF THE DRAWINGS

FIG. 2 is a perspective exploded view of a working machine of a preferred embodiment in accordance with the present invention;

DETAILED DESCRIPTION OF THE INVENTION

Figure 1:
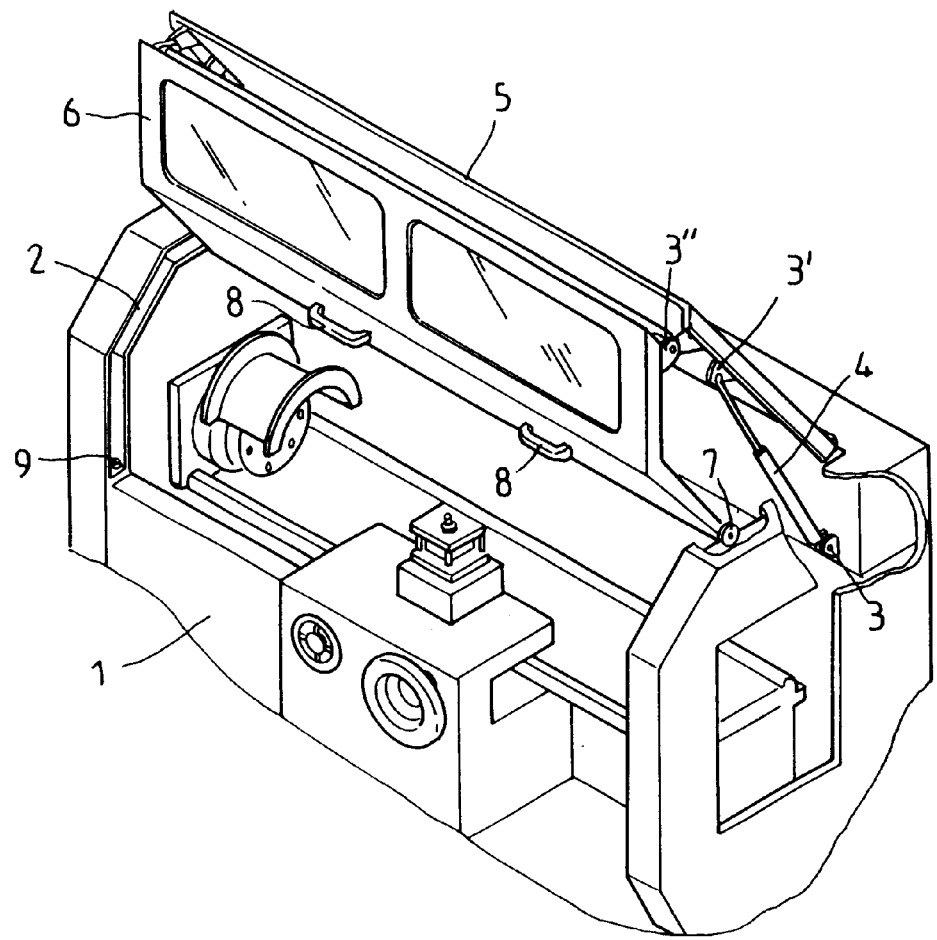
FIG. 1 is a perspective view of a working machine of the prior art.
Figure 3:
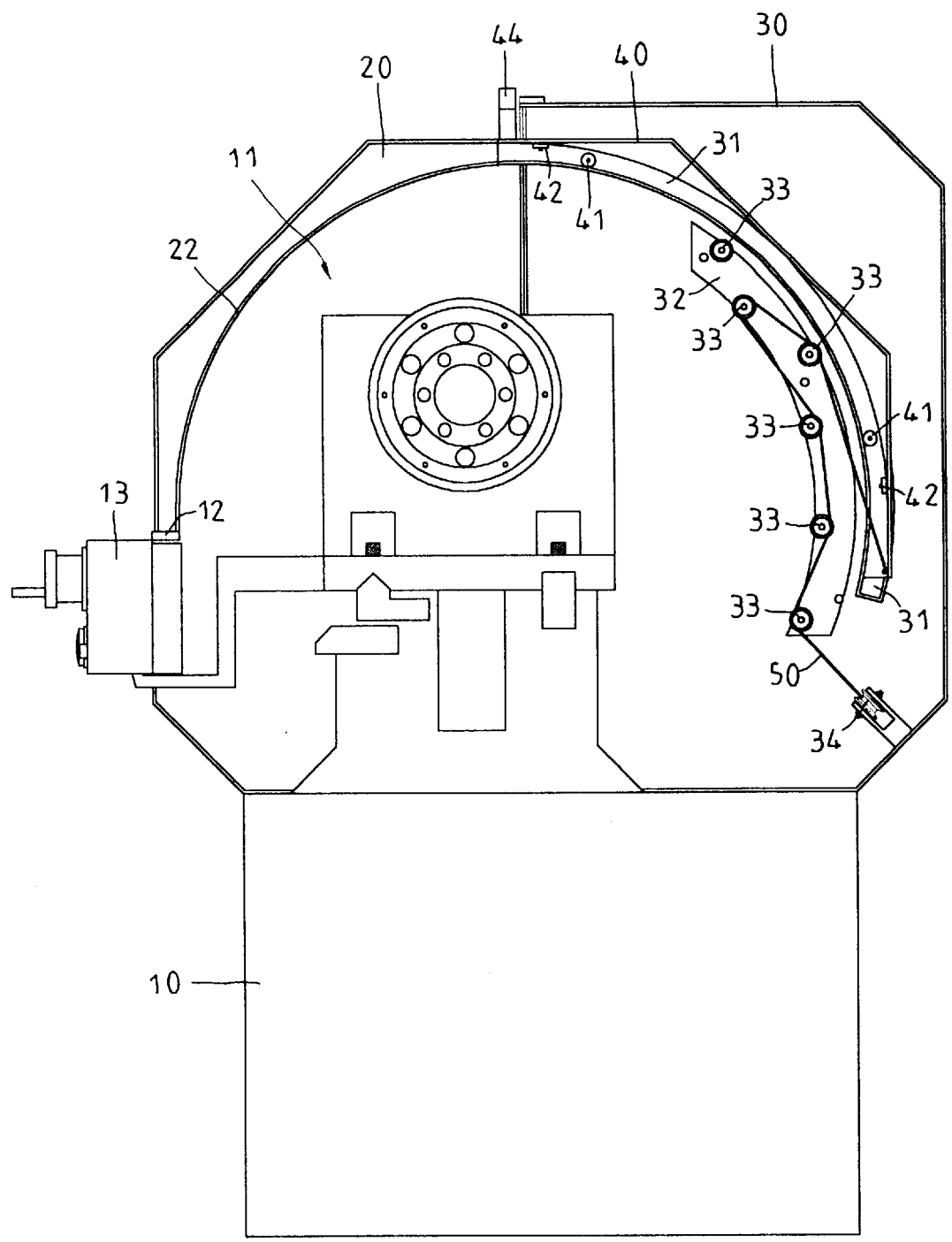
FIG. 3 is a schematic view illustrating a safety door is opened.
Figure 4:
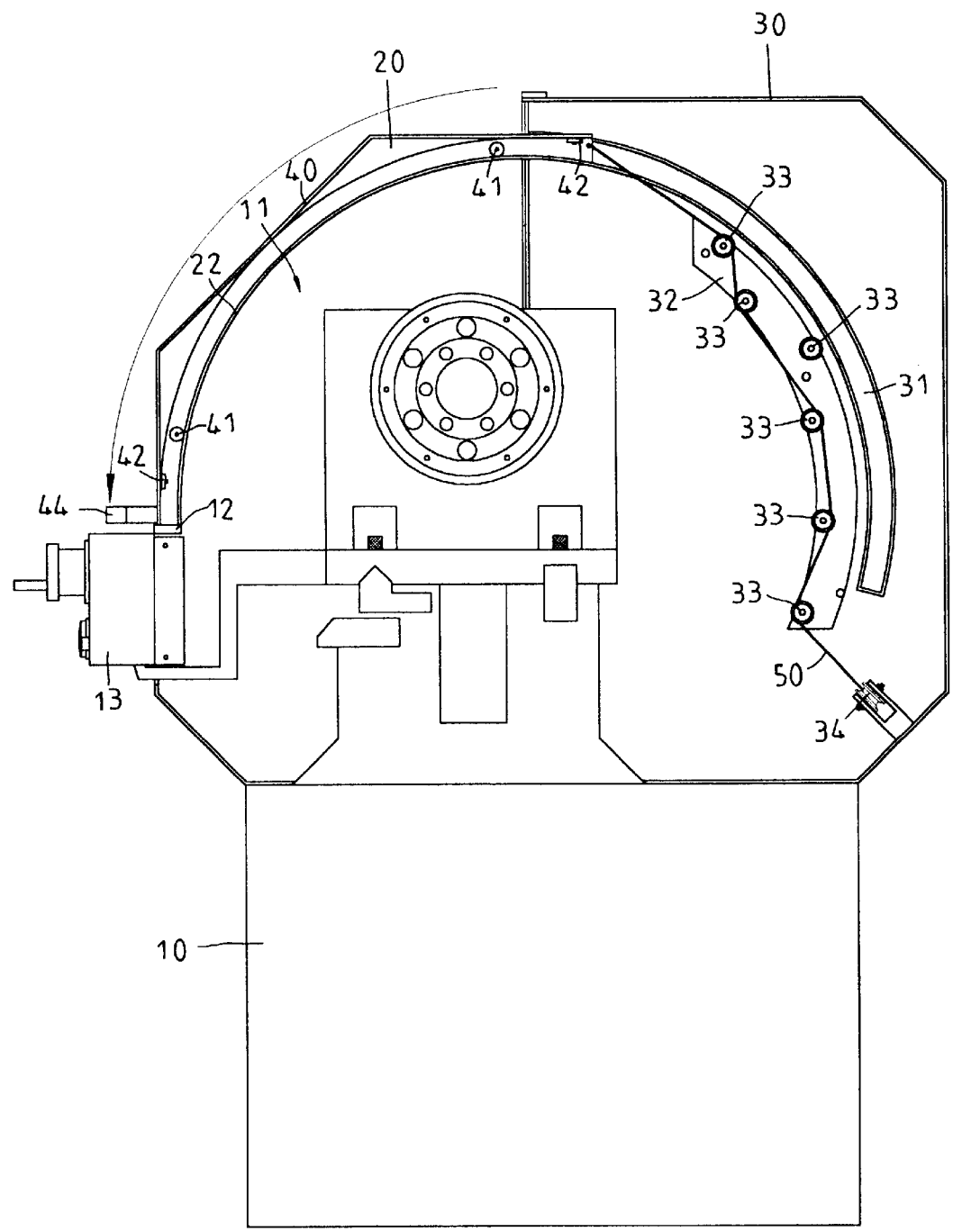
FIG. 4 is a schematic view illustrating a safety door is closed.
Figure 5:
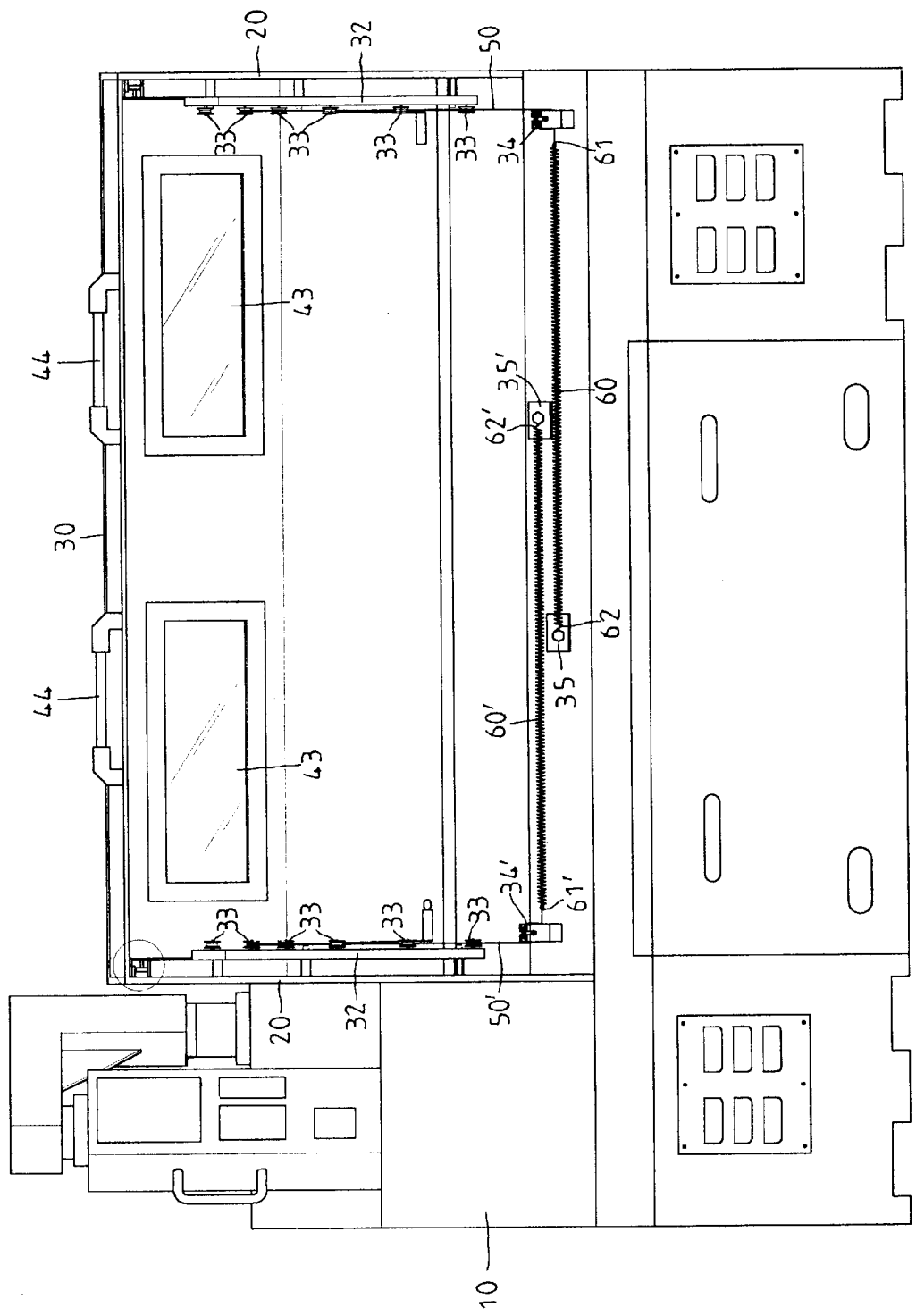
FIG. 5 is a schematic view illustrating an operation of a first spring and a second spring.
Figure 6:
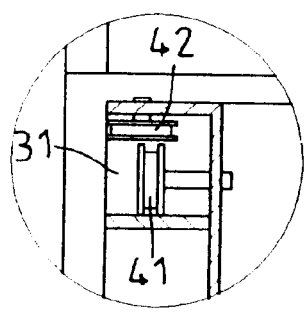
FIG. 6 is a partially sectional view of an arc frame.

Referring to FIGS. 2 to 6 first, a working machine comprises a platform 10, a hood 30 disposed on the platform 10, two lateral plates 20 disposed on the platform 10 and connected to the hood 30, a hollow interior 11 confined by the hood 30 and the lateral plates 20, and a safety door 40 connected to the lateral plates 20.

One of the lateral plates 20 has an oblong opening 21.

Each of the lateral plates 20 has a semicircular frame 22.

The hood 30 has two arc plates 32, and two arc frames 31 each communicating with the corresponding semicircular frame 22.

Each of the arc plates 32 has a plurality of guide wheels 33.

A first pulley 34 and a first positioning seat 35 are disposed in the hood 30.

A second pulley 34' and a second positioning seat 35' are disposed in the hood 30.

A first spring 60 has a first end 62 connected to the first positioning seat 35.

A second spring 60' has a second end 62' connected to the second positioning seat 35'.

A first rope 50 is connected to a second end 61 of the first spring 60.

A second rope 50' is connected to a second end 61' of the second spring 60'.

The first rope 50 passes through the first pulley 34 and the corresponding guide wheels 33 and connects to the safety door 40.

The second rope 50' passes through the second pulley 34' and the corresponding guide wheels 33 and connects to the safety door 40.

The safety door 40 has two oblong windows 43, two handles 44, a plurality of rollers 42 disposed on two sides of the safety door 40, and a plurality of rolling bearings 41 disposed on two sides of the safety door 40.

The rollers 42 and the rolling bearings 41 move along the corresponding arc plate 31 and the corresponding semicircular frame 22.

An elongated bar 12 is disposed between the lateral plates 20.

The invention is not limited to the above embodiment but various modification thereof may be made. Further, various changes in form and detail may be made without departing from the scope of the invention.

I claim:

1. A working machine comprising a platform, a hood disposed on the platform, two lateral plates disposed on the platform and connected to the hood, a hollow interior confined by the hood and the lateral plates, and a safety door connected to the lateral plates, characterized in that:

each of the lateral plates has a semicircular frame, the hood has two arc plates, and two arc frames each communicating with the corresponding semicircular frame, each of the arc plates has a plurality of guide wheels, a first pulley and a first positioning seat are disposed in the hood, a second pulley and a second positioning seat are disposed in the hood, a first spring has a first end connected to the first positioning seat, a second spring has a second end connected to the second positioning seat, a first rope is connected to a second end of the first spring, a second rope is connected to a second end of the second spring, the first rope passes through the first pulley and the corresponding guide wheels and connects to the safety door, the second rope passes through the second pulley and the corresponding guide wheels and connects to the safety door, the safety door has two oblong windows, two handles, a plurality of rollers disposed on two sides of the safety door, and a plurality of rolling bearings disposed on two sides of the safety door, and the rollers and the rolling bearings move along the corresponding arc plate and the corresponding semicircular frame.

* * * * *